United States Patent
Krishnakumar et al.

(10) Patent No.: US 10,209,789 B2
(45) Date of Patent: Feb. 19, 2019

(54) ENABLING A USER TO ENTER NOTES WITHOUT AUTHENTICATING THE USER

(71) Applicant: Dell Products L. P., Round Rock, TX (US)

(72) Inventors: Karthikeyan Krishnakumar, Austin, TX (US); Preeth K. Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 15/434,426

(22) Filed: Feb. 16, 2017

(65) Prior Publication Data

US 2018/0232069 A1    Aug. 16, 2018

(51) Int. Cl.
| | |
|---|---|
| G06F 3/033 | (2013.01) |
| G06F 3/0354 | (2013.01) |
| G06F 21/35 | (2013.01) |
| G06F 1/16 | (2006.01) |
| G06F 3/0488 | (2013.01) |
| G06F 3/01 | (2006.01) |
| G06F 3/038 | (2013.01) |
| G06K 9/22 | (2006.01) |

(52) U.S. Cl.
CPC ........ G06F 3/03545 (2013.01); G06F 1/1643 (2013.01); G06F 1/1647 (2013.01); G06F 3/017 (2013.01); G06F 3/0383 (2013.01); G06F 3/0488 (2013.01); G06F 21/35 (2013.01); G06K 9/22 (2013.01); *G06F 2221/2151* (2013.01)

(58) Field of Classification Search
CPC .... G06F 3/03545; G06F 3/033; G06F 3/0354; G06F 3/0317; G06F 2203/04101; G06F 3/03542; G06F 3/0386; G06F 3/0416; G06F 21/35; G06F 2221/2151
See application file for complete search history.

(56) References Cited

U.S. PATENT DOCUMENTS

| | | | |
|---|---|---|---|
| 2014/0118314 A1* | 5/2014 | Black | G06F 3/03545 345/179 |
| 2014/0253467 A1* | 9/2014 | Hicks | G06F 3/033 345/173 |

* cited by examiner

*Primary Examiner* — Adam R. Giesy
(74) *Attorney, Agent, or Firm* — Campbell Stephenson LLP; Shiv S. Naimpally

(57) ABSTRACT

In some examples, a computing device may authenticate a user. The user may pair a stylus with the computing device. The stylus may include one or more buttons. After the user performs a first sequence of button presses using the buttons of the stylus, the computing device may receive a first instruction that causes the computing device to begin execution of an application. The application may receive input in response to the user manipulating the stylus on a touchscreen of the computing device. After the user performs a second sequence of button presses using the buttons of the stylus, the computing device may receive a second instruction that causes the computing device to save the input. The computing device may provide the user with access to the saved input in accordance with an access level associated with the stylus.

20 Claims, 8 Drawing Sheets

ENABLING A USER TO ENTER NOTES WITHOUT AUTHENTICATING THE USER

BACKGROUND OF THE INVENTION

Field of the Invention

This invention relates generally to computing devices capable of receiving stylus-based input and, more particularly, to allowing note taking via a stylus before authenticating the user.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A touchscreen computing device, such as a tablet or 2-in-1 device, may be used with an operating system (e.g., Windows® 10 or similar) to receive input from a stylus (also referred to as pen-input or pencil-input). However, for security purposes, the operating system may require user authentication (e.g., requiring the user to provide a username and password) before a user may use the stylus to provide input. The user authentication process may slow the user's ability to take notes because the user must login, launch an application (e.g., a note-taking application), and then use the stylus to enter notes.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may authenticate a user. The user may pair a stylus with the computing device. The stylus may include one or more buttons. After the user performs a first sequence of button presses using the buttons of the stylus, the computing device may receive a first instruction that causes the computing device to begin execution of an application. The application may receive input in response to the user manipulating the stylus on a touchscreen of the computing device. After the user performs a second sequence of button presses using the buttons of the stylus, the computing device may receive a second instruction that causes the computing device to save the input. The computing device may provide the user with access to the saved input in accordance with an access level associated with the stylus.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
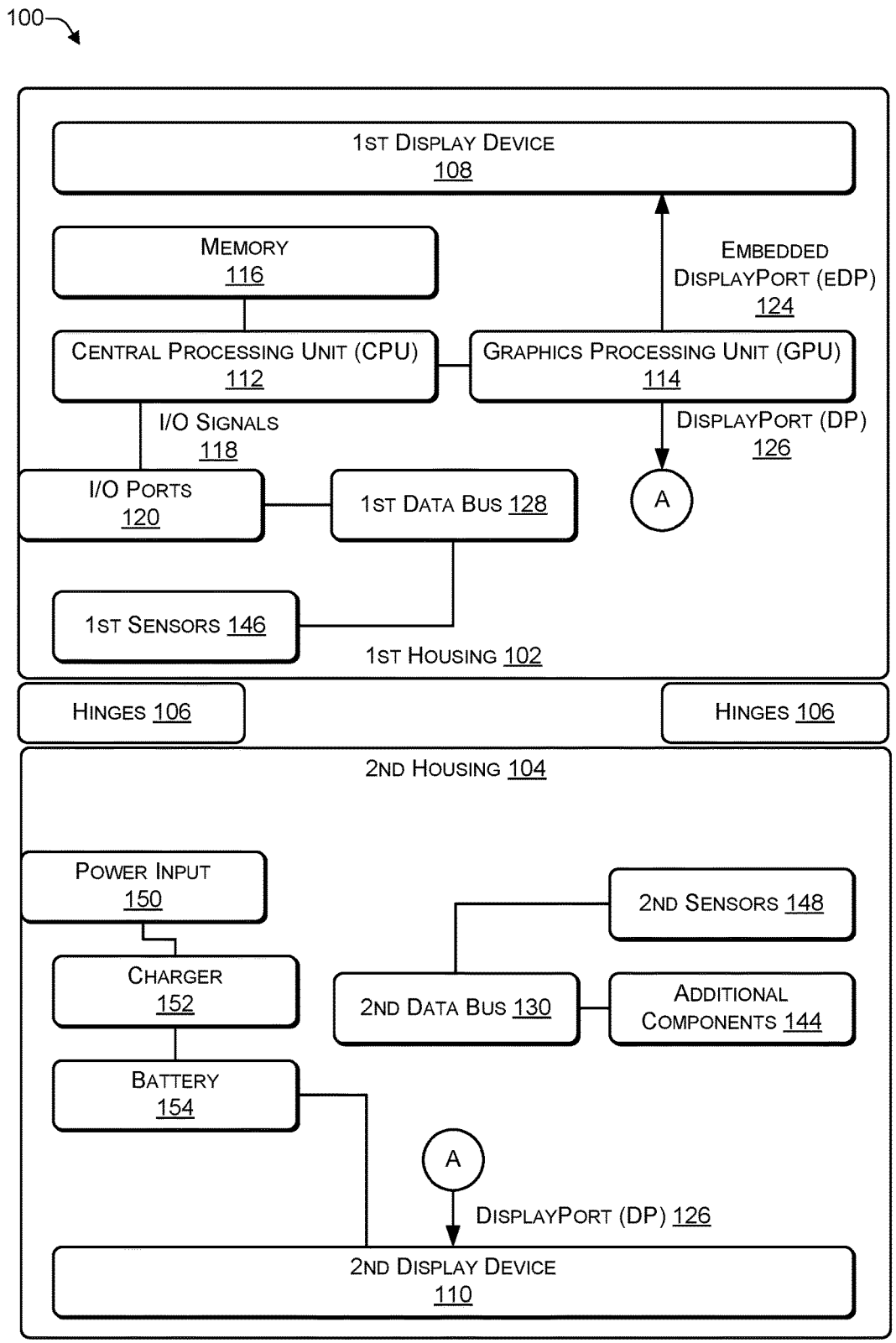
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a user to use a computing device and stylus in a manner similar to a pad of paper (or paper-based notebook) and ink-based pen (or graphite-based pencil). For example, the user can, without having to undergo an authentication process, power-on (or wake from a low power consumption state, such as hibernation) the computing device and provide stylus input (e.g., enter notes) using an application being executed by the computing device. In some cases, the application may provide the user with write-only access, e.g., the user may be able to provide stylus input and store the stylus input but may be restricted from viewing or editing the previously stored stylus input. In other cases, the application may provide the user with partial read-write access, e.g., the user may be able to provide stylus input and store the stylus input in addition to being able to view and edit previously stored stylus input that the user authored. The user may be unable to view and edit previously stored stylus input that the user did not author. In still other cases, the application may provide the user with full read-write access, e.g., the user may be able to provide stylus input and store the stylus input in addition to being able to view and edit previously stored stylus input (e.g., authored by any user).

For example, a computing device may include one or more processors, and one or more computer-readable storage media to store instructions that are executable by the one or more processors to perform various operations. To illustrate, the operations may include authenticating a first user and pairing a first stylus to the computing device. The first stylus may include one or more buttons. The computing device may receive a launch instruction from the first stylus. The launch instruction may be sent from the first stylus to the computing device in response to the first user entering a first ordered sequence of button presses of the one or more buttons of the first stylus. If the computing device is in a low power consumption state (e.g., hibernation state) then the launch instruction may cause the computing device to transition from the low power consumption state to a power on state (e.g., normal power consumption state). The launch instruction may cause the computing device to initiate execution of a first application. The first application may receive first input based at least in part on contact between the first stylus and a touchscreen display of the computing device. The first input may include at least one of (1) stylus input received from the touchscreen display in response to the first user manipulating the first stylus on the touchscreen display or (2) text input created by performing optical character recognition on the stylus input. The computing device may receive a save instruction from the first stylus. The save instruction may be sent from the first stylus to the computing device in response to the first user entering a second ordered sequence of button presses of the one or more buttons of the first stylus. The save instruction may cause the computing device to save the first input to a memory of the computing device, to a cloud-based storage service, or both. In some cases, a time stamp and a first access level (e.g., associated with the first stylus) may be associated with the first input before the first input is saved. The first input may be saved in a folder associated with the first user. The first user may be provided with access to the first input in accordance with the first access level. The first access level may be one of: (1) write-only access that denies the first user read-access to the first input and denies the first user write-access to the first input, (2) partial read-write access that provides the first user with read-access to the first input but denies the first user write-access to the first input, or (3) full read-write access that provides the first user with read-access to the first input and provides the first user with write-access to the first input. The first user may be authenticated before the first user is provided with access to the first input in accordance with the first access level.

The computing device may receive the launch instruction from a second stylus that is not paired with the computing device and, in response, launch a second application. The launch instruction may be sent from the second stylus to the computing device in response to a second user entering the first ordered sequence of button presses of the one or more buttons of the second stylus. The second application may be the same application as the first application or may be a different application from the first application. The second application may receive second input based on contact between the second stylus and the touchscreen display of the computing device. The computing device may receive a save instruction from the second stylus. The save instruction may be sent from the second stylus to the computing device in response to the second user entering the second ordered sequence of button presses of the one or more buttons of the second stylus. In response to receiving the save instruction from the second stylus, the computing device may save the second input. In some cases, a time stamp and a second access level (e.g., associated with the second stylus) may be associated with the second input before the second input is saved. The second user may be provided with access to the second input in accordance with the second access level. The first user may be provided with access to the second input in accordance with the first access level. For example, the second stylus may have write-only access, enabling the second user to create and save second input (e.g., a note). However, the second user may be unable to view or edit the second input. The first stylus may have full read-write access, enabling the first user to create and save first input, view and edit the first input, and view and edit the second input. Thus, access to the second input may be restricted to the first user. In some cases, after the second user has provided the second input, the cloud-based service may send an alert to a device (e.g., the first stylus, a phone, or the like) specified by the first user. The alert may indicate that a note was left for the first user.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 102 coupled to a second housing 104 via one or more hinges 106. The hinges 106 may enable the two housings 102, 104 to be positioned at different angles relative to each other in different orientations (e.g., various vertical orientations and various horizontal orientations). Of course, additional housings may be attached via additional hinges to create a computing device with multiple housings.

A first display device 108 may be located in the first housing 102 and, in some cases, a second display device 110 may be located in the second housing 104. A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 102 and two or more lanes of DisplayPort (DP) output 126 that are sent (e.g., wirelessly or via a cable) to the second display device 110 in the second housing 104.

A first data bus 128 in the first housing 102 and a second data bus 130 in the second housing 104 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 104 may include a remaining portion of the components of the computing device 100. In some cases, the components in the second housing 104 may be located behind the second display device 110. The second housing 104 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 102 with the components of the computing device 100 located in the second housing 104. In other cases, a first wireless transceiver in the first housing 102 and a second wireless transceiver in the second housing 104 may provide wireless communications between (1) the components of the computing device 100 located in the first housing 102 and (2) the components of the computing device 100 located in the second housing 104. The first set of sensors 146 and the second sensors 152 may include one or more of a touch-screen sensor, an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, another type of sensor, or any combination thereof.

In FIG. 1, the first set of components of the computing device 100 shown as being located in the first housing 102 and the remaining set of components shown as located in the second housing 104 are purely for illustration purposes. Depending on the implementation, different components of the computing device 100 may be housed in one or both of the housings 102, 104. For example, when the computing device 100 is designed for graphics processing, the GPU 114 and supporting hardware (e.g., graphics support chips, graphics memory, and the like) may be housed in the second housing 104. As another example, in some cases, the ports 120 may be located in the first housing 102, in the second housing 104, or split between the two housings 102, 104. As a further example, the battery 154 may include multiple power cells, with a portion of the power cells located in the first housing 102 and zero or more of the power cells located in the second housing 104. In some cases, which components of the computing device 100 are located in each of the housings 102, 104 may be determined by the thermal characteristics of the components. For example, the components may be distributed between the housings 102, 104 to enable each of the housings 102, 104 to heat to approximately the same temperature. Doing so may avoid grouping components that generate the most heat into the same housing, thereby causing one housing to be hotter than the other housing. In addition, while the computing device 100 is illustrated as having two display devices 108, 110, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, may be stored in the memory 116. The software instructions may be executed by the CPU 112, by the DSP processor 122, or any combination thereof.

Thus, a computing device may include a first housing coupled to a second housing by one or more hinges. The computing device 100 may include software that enables a user to use the computing device 100 with a stylus in a manner similar to a pad of paper (or paper-based notebook) and ink-based pen (or graphite-based pencil). For example, the user may, without having to undergo an authentication process, power-on (or wake from a low power consumption state, such as hibernation) the computing device 100 and provide stylus input (e.g., enter notes) using an application being executed by the computing device 100. The user may specify an access level indicating the level of access to previously stored notes. For example, when a write-only access level is specified, the user may be able to provide stylus input and store the stylus input but may be unable to view or edit the previously stored stylus input. When a partial read-write access level is specified, the user may be able to provide stylus input and store the stylus input in addition to being able to view and edit previously stored stylus input that the user authored. The user may be unable to view and edit previously stored stylus input that the user did not author. When a full read-write access level is specified, the user may be able to provide stylus input and store the stylus input in addition to being able to view and edit previously stored stylus input (e.g., authored by any user).

In some cases, the note taking application may be available even before the first user is first authenticated. For example, the user may, without having to undergo any authentication, power-on (or wake from a low power consumption state, such as hibernation) the computing device 100 and provide stylus input (e.g., enter notes) using an application being executed by the computing device 100. In this situation, the stylus input may be write-only, e.g., the user may be unable to view and edit the stylus input after the stylus input has been stored.

Figure 2:
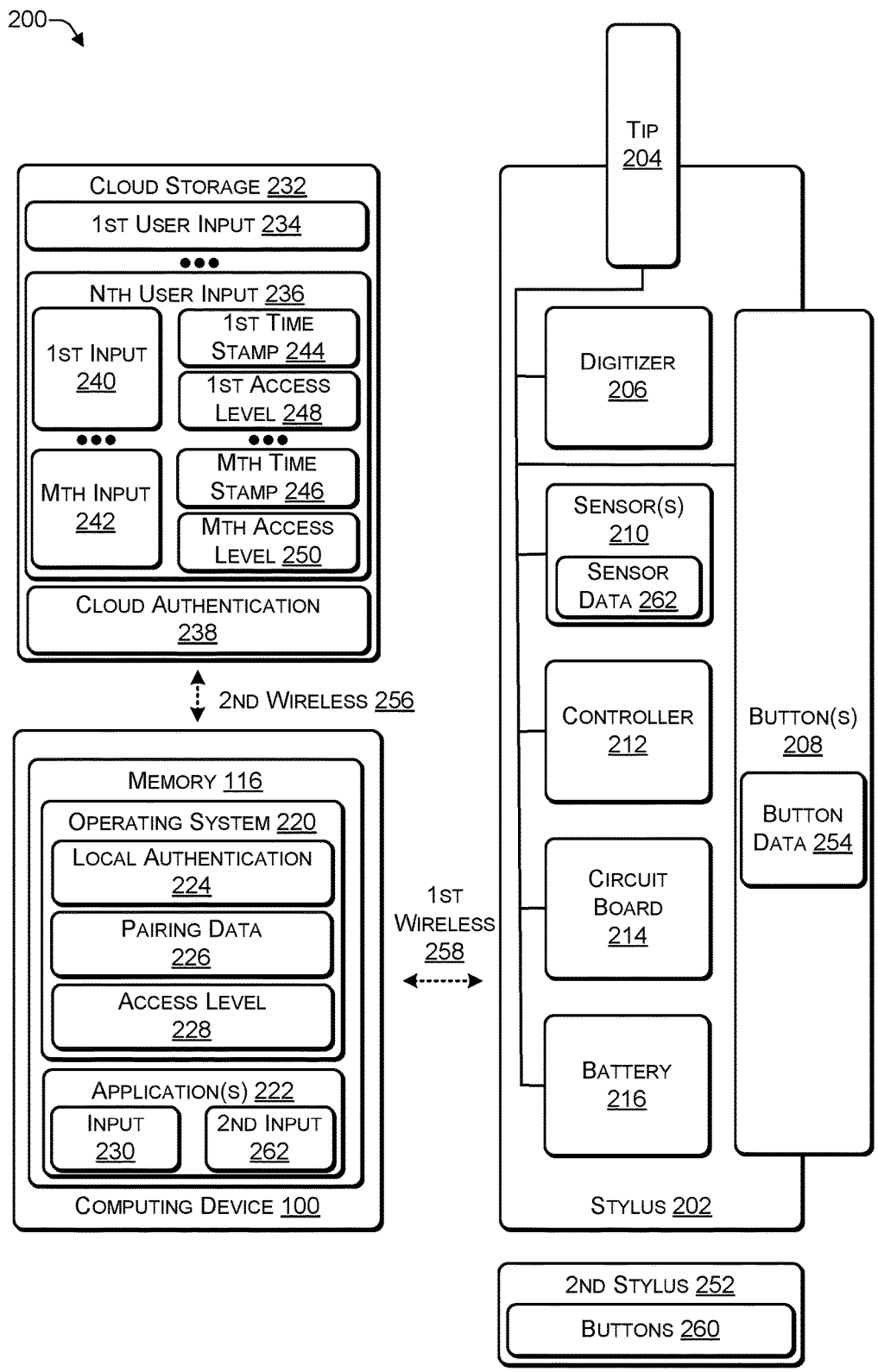
FIG. 2 is a block diagram of an architecture that includes a computing device and a stylus according to some embodiments.

FIG. 2 is a block diagram of an architecture 200 that includes a computing device and a stylus according to some embodiments.

A stylus 202 (e.g., active stylus) may include a tip 204, a digitizer 206, one or more buttons 208, one or more sensors, a controller 212, a circuit board 214, and at least one battery 216. The tip 204 may be used by a user to apply pressure to a touch sensitive display (e.g., the displays 108, 110 of FIG. 1). One of the sensors 210 may be embedded into the tip 204 and may be used to measure different levels of pressure (e.g., 0 to 16, 0 to 256, or other pressure levels). The sensors 210 may include a pressure sensor (to measure an amount of pressure exerted by the tip 204), a location detection sensor (to determine a current location of the tip 204), a motion sensor (to determine a motion of the tip 204), a tilt sensor (e.g., to measure an angle at which the stylus 202 is being held), another type of sensor, or any combination thereof. The sensors 210 may generate sensor data 262. The sensor data 262 may include digital data and analog data. The digitizer 206 may digitally sample analog signals received from one or more of the sensors 210 to create digital signals. The controller 212 may be an embedded controller, a CPU, or another type of logic-execution device that is programmed to perform specific functions, such as receiving the sensor data 262 from the sensors 210, receiving button data 254 from one or more of the buttons 208, transmitting the data 262, 254 to the computing device 100, receiving and acting upon commands (e.g., a pairing command) received from the computing device 100, and the like. One or more of the digitizer 206, the buttons 208, the sensors 210, the controller 212, and the battery 216 may be mounted on the circuit board 214. The battery 216 may provide power (e.g., direct current (DC) voltage) to one or more of the components 204, 206, 208, 210, 212, and 214 of the stylus 202. The circuit board 214 may also include a transducer (e.g., speaker, buzzer, or the like) and one or more lights (e.g., LED or the like).

The memory 116 of the computing device 100 may be used to store software instructions, such as an operating system 220 and one or more applications 222. The operating system 220 may include a local authentication module 224 to authenticate users of the computing device 100. For example, the computing device 100 may authenticate a user by requesting and authenticating, one or more of a username, a password, a passcode, biometric input (e.g., fingerprint scan, retinal scan, or the like), or another type of authentication data. The operating system 220 may store pairing data 226 identifying other devices (e.g., the stylus 202) with which the computing device 100 is currently paired. An access level 228 may be associated with each user and with each paired device. For example, after pairing the stylus 202 to the computing device 100, the user may specify that input received from the stylus 202 has the access level 228. The access level 228 may, for example, be write-only, partial read-write, or full read-write. The applications 222 may include applications capable of receiving input 230 via one or more input devices, such as the stylus 202, a keyboard, a trackpad, a numeric keypad, another type of input device, or any combination thereof. The input 230 may include input received via a user manipulating a stylus (e.g., the stylus 202 or 252), such as letters, words, sentences, paragraphs and the like written in a cursive or printed script, drawings or other graphical input, and other types of input.

At least one cloud storage 232 facility may be accessible to the computing device 100 (and to a user of the computing device 100). The cloud storage 232 may be used to store input associated with multiple users, including first user input 234 associated with a first user and Nth user input 236 associated with an Nth user (where N>1). To provide security and access control, the cloud storage 232 may perform cloud authentication 238 prior to enabling a particular user to view the stored input associated with the particular user. For example, the cloud authentication 238 may authenticate a user by requesting and authenticating one or more of a username, a password, a passcode, biometric input (e.g., fingerprint scan, retinal scan, or the like), or another type of authentication data. After authentication, a particular user may be able to access previously stored input associated with the particular user. Depending on whether another user has given a particular user access, the particular user may nor may not be able to access previously stored input associated with other users. For example, a first user, after authentication, may be able to access the previously stored first user input 234 and an Nth user, after authentication, may be able to access the previously stored Nth user input 236. To illustrate, if the Nth user has provided the first user with access to the Nth user input 236, the first user may be able to access the Nth user input 236. For example, the access may be read-only or read-write. If the Nth user has not provided (or denied) the first user access to the Nth user input 236, the first user may be unable to access the Nth user input 236.

Each of the user input folders 234, 236 may include a set of zero or more previously created and stored inputs. In some cases, a time stamp may be associated with each input. In some cases, an access level of the device used to create each input may be stored with each input. For example, the Nth user input 236 may include previously stored inputs, such as a first input 240 to an Mth input 242 (where M>1). The inputs 340, 242 may include data entered into an application being executed by a computing device and may include data entered using an input device, such as a stylus, a keyboard, a trackpad, or other type of input device. Each of the inputs 240, 242 stored in the cloud storage 232 may have an associated time stamp indicating when the corresponding input was received or stored in the cloud storage 232. For example, the first input 240 may have an associated first time stamp 244 and the Mth input 242 may have an associated Mth time stamp 250. Each of the inputs 240, 242 stored in the cloud storage 232 may have an associated access level indicating access level of the device that was used to create the corresponding input. For example, the first input 240 may have an associated first access level 248 and the Mth input 242 may have an associated Mth access level 250. To illustrate, if the stylus 252, with a write-only access level, creates the Mth input 242, then a user of the stylus 252 may be unable to access (e.g., view or edit) the Mth input 242 or may have restricted access to the Mth input 242. If the stylus 252, with a partial read-write access level, creates the Mth input 242, then a user of the stylus 252 may be able to access (e.g., view and edit) the Mth input 242 as well as other inputs created with the stylus 252. However, the user may be unable to access other inputs that are stored in the Nth user input folder 236 that are created by other devices (e.g., the stylus 202). If the stylus 202, with a full read-write access level, creates the Mth input 242, then a user of the stylus 252 may be able to access (e.g., view and edit) the Mth input 242 and may be able to access other inputs in the Nth user input folder 236.

The computing device 100 may communicate with the stylus 202 and the stylus 252 using a first wireless technology 258, such as Bluetooth®, ZigBee®, wireless universal serial bus (USB), or other Near Field Communication (NFC) technology that provides wireless communications over a short distance. The computing device 100 may communicate with the cloud storage using a second wireless technology 256, such as WiFI®, code division multiple access (CDMA), global system for mobile (GSM), or other technique that provides wireless communications over a medium or a long distance.

A user may perform the local authentication 224 to login to the computing device 100. The user may pair the stylus 202 with the computing device 100 using the first wireless technology 258. The details (e.g., which type of device was paired, user identifier, and the like) associated with the pairing may be stored as the pairing data 226. For example, the pairing data 226 may include information indicating that the stylus 202 has a particular device identifier and indicating that the stylus 202 is currently paired with the computing device 100.

The user may provide a particular instruction that causes one (or more) of the applications 222 (e.g., a note taking application) to launch (e.g., instantiate) and begin executing on the computing device 100. The particular instruction that causes one (or more) of the applications 222 to automatically launch may be defined by the user. The particular of the applications 222 that are automatically launched may be specified by the user. The user may provide the particular instruction using the stylus 202, e.g., using one or more of the tip 204, the buttons 208, the sensors 210, or any combination thereof. For example, the user may perform X clicks (where X>0) of a particular one of the buttons 208, a particular ordered combination of clicks of the buttons 208, X taps of the tip 204 in a particular location in one of the touchscreen display devices 108, 110 of FIG. 1, or the like. To illustrate, the user may click a particular one of the buttons 208 twice to launch a particular application, such as a note-taking application (e.g., OneNote®, Bamboo Paper®, or the like). In some cases, the particular instruction may power on the computing device 100 (e.g., from a power off state or a low power consumption state, such as a hibernate state) in addition to causing the computing device 100 to launch the application (e.g., an application capable of receiving stylus input).

The computing device 100 may determine the access level 228 associated with the stylus 202. The user may provide the input 230 to one of the applications 222 using the stylus 202. For example, the input 230 may include cursive letters and numbers, printed letters and numbers, drawings, doodles, and other types of input that can be provided using a stylus. In some cases, the computing device 100 may use optical character recognition (OCR) or another technique to convert at least a portion of the input into text input. The application 222 that receives the input 230 may store the input locally, e.g., in the memory 116. The computing device 100 may store information as to which user is associated with which stylus. For example, if a second user uses stylus #XYZ to leave a note, the computing device 100 may have a table identifying the owner of stylus #XYZ.

In response to detecting the occurrence of a particular event, the computing device 100 may automatically (e.g., without human interaction) save the input 230 to the cloud storage 232. For example, if the Nth user provided the input 230 using the stylus 202, the input 230 may be transmitted using the second wireless technology 256 to the cloud storage 232 for storage in the corresponding user's account. The particular event that causes the computing device 100 to automatically save the input 230 to the cloud storage 232 may be defined by the user. The particular event that causes (e.g., triggers) the computing device 100 to automatically save the input 230 may include a particular instruction sent as a result of the user performing one or more actions, such as the user performing Y clicks (where Y>0 and Y not equal to X) of a particular one of the buttons 208, performing a particular ordered combination of clicks of the buttons 208, performing Y taps of the tip 204 in a particular location in one of the touchscreen display devices 108, 110 of FIG. 1, or the like. For example, the user may click a particular one of the buttons 208 three times to save the input 230 to the cloud storage 232. The particular event that causes (e.g., triggers) the computing device 100 to automatically save the input 230 may include a timeout, e.g., if the computing device 100 does not receive additional input from the stylus 202 for more than Z seconds (e.g., Z>10) then the computing device 100 may automatically save the input 230 to the cloud storage 232. The user may define the size of the timeout that determines when the input 230 is saved to the cloud storage 232. The particular event that causes (e.g., triggers) the computing device 100 to automatically save the input 230 may include the user selecting a "save" selection in a user interface of one of the applications 222.

The input 230 may be saved along with a time stamp (e.g., indicating when the input 230 was received or saved by the cloud storage 232) and the access level 228 associated with the user of the stylus 202. The cloud storage 234 may provide access to the saved input 230 according to the access level 228. For example, assume the input 230 is stored as the Mth input 242 and the Mth access level 250 identifies the access level 228. If the Mth access level 250 is write-only, then a user of the stylus 202 may be unable to access (e.g., view or edit) the Mth input 242. If the Mth access level 250 is partial read-write, then a user of the stylus 202 may be able to access (e.g., view and edit) the Mth input 242 as well as other inputs created with the stylus 202 but may be unable to access other inputs created by other devices (e.g., the stylus 252) in the Nth user input folder 236. If the Mth access level 250 is full read-write access level, then a user of the stylus 202 may be able to access (e.g., view and edit) the Mth input 242 and may be able to access all of the inputs 240 to 242 in the Nth user input folder 236.

A second user may provide the particular instruction that causes one (or more) of the applications 222 (e.g., a note taking application) to launch (e.g., instantiate) and begin executing on the computing device 100. The particular instruction that causes one (or more) of the applications 222 to automatically launch may be defined by the user of the computing device 100. The particular of the applications 222 that are automatically launched may be specified by the user of the computing device 100. For example, the second user may provide the particular instruction using the second stylus 252 (e.g., using one or more of the tip, buttons 260, the sensors, or the like of the second stylus 252). The second stylus 252 may not be paired with the computing device 100 (e.g., the second stylus 252 may be paired with a second computing device associated with the second user). The second user may perform X clicks (where X>0) of a particular one of the buttons 260, a particular ordered combination of clicks of the buttons 260, X taps of the tip of the second stylus 252 (e.g., in a particular location in one of the touchscreen display devices 108, 110 of FIG. 1), or the like. To illustrate, the second user may click a particular one of the buttons 260 twice to launch a particular application, such as a note-taking application (e.g., OneNote®, Bamboo Paper®, or the like). In some cases, the particular instruction may power on the computing device 100 (e.g., from a power off state or a hibernate state) in addition to causing the computing device 100 to launch the application (e.g., an application capable of receiving stylus input).

The computing device 100 may determine the access level 228 associated with the second stylus 252. The second user may provide the input 230 to one of the applications 222 using the stylus 252. For example, the input 230 may include cursive letters and numbers, printed letters and numbers, drawings, doodles, and other types of input that can be provided using a stylus. In some cases, the computing device 100 may use optical character recognition (OCR) or another technique to convert at least a portion of the input 230 into text-based input. The application 222 that receives the input 230 may store the input locally, e.g., in the memory 116.

In response to detecting a particular event, the computing device 100 may automatically (e.g., without human interaction) save the input 230 to the cloud storage 232. The particular instruction that causes the computing device 100 to automatically save the input 230 to the cloud storage 232 may be defined by a default setting of the operating system 220 or the user of the computing device 100. For example, if the first user provided the input 230 using the stylus 252, the input 230 may be transmitted using the second wireless technology 256 to the cloud storage 232 for storage in the first user's account. The particular event that causes (e.g., triggers) the computing device 100 to automatically save the input 230 may include a particular instruction provided by the user such as Y clicks (where Y>0 and Y not equal to X) of a particular one of the buttons of the second stylus 252, a particular ordered combination of clicks of the buttons of the second stylus 252, Y taps of the tip of the second stylus 252 (e.g., in a particular location in one of the touchscreen display devices 108, 110 of FIG. 1), or the like. For example, the user may click a particular one of the buttons of the second stylus 252 three times to save the input 230 to the cloud storage 232. The particular event that causes (e.g., triggers) the computing device 100 to automatically save the input 230 may include a timeout, e.g., if the computing device 100 does not receive additional input from the stylus second 252 for more than Z seconds (e.g., Z>10) then the computing device 100 may automatically save the input 230 to the cloud storage 232. The user associated with the computing device 100 may define the size of the timeout that determines when the input 230 is saved to the cloud storage 232. The particular event that causes (e.g., triggers) the computing device 100 to automatically save the input 230 may include the second user selecting a "save" selection in a user interface of one of the applications 222.

The input 230 may be saved along with a time stamp (e.g., indicating when the input 230 was received or saved by the cloud storage 232) and the access level 228 associated with the second user of the second stylus 252. The cloud storage 234 may provide access to the saved input 230 according to the access level 228. For example, assume the input 230 is stored in the first input folder 234 with a first access level and a first time stamp. If the first access level is write-only, then the second user of the second stylus 252 may be unable to access (e.g., view or edit) the first input. If the first access level is partial read-write, then the second user of the second stylus 252 may be able to access (e.g., view and edit) the first input as well as other inputs created with the second stylus 252 but may be unable to access other inputs (e.g., the Mth input 242) created by other devices (e.g., the stylus 202). If the first access level is full read-write access level, then a user of the stylus 252 may be able to access (e.g., view and edit) all of the inputs stored in the first user input folder 234.

In some cases, a first user and a second user may simultaneously provide input using the stylus 202 and stylus 252. For example, the first user and second user may be collaborating on a particular project. In such a scenario, the first user may use the stylus 202 to provide the input 230 to the computing device 100. Substantially at the same time, the second user may use the second stylus 252 to provide the second input 262 to the computing device 100. The input 230, 262 may be provided on one or both of the display devices 108, 110. When simultaneous input is received, if both the stylus 202 and 252 have not been authenticated with the computing device 100, the input 230, 262 may be write-only. When simultaneous input is received, if the first user (of the stylus 202) has been authenticated and the second user (of the second stylus 252) has not been authenticated with the computing device 100, the first user may be able to view and edit the inputs 230, 262 while the second user may be unable to view or edit the inputs 230, 262.

Thus, a first user may login to (e.g., be authenticated by) a computing device and pair a first stylus with the computing device. The first user may provide a particular instruction (e.g., two clicks of a particular button of a stylus, such as the first stylus) using the first stylus to launch an application that is capable of receiving stylus input. The first user may define (1) which particular instruction causes the application to be launched and (2) which application is launched. The stylus input may be stored in a remote (e.g., cloud-based) storage in response to a particular event (e.g., a particular instruction from the stylus, a timeout, or the like). In this way, the first user can begin taking notes using the computing device and the first stylus without being asked to login (e.g., be authenticated) again. The relationship (e.g., pairing) between the first stylus and the computing device establishes a trusted relationship. Thus, the first user's possession of the first stylus is sufficient to identify the first user to the computing device at a particular access level. Therefore, the computing device may not authenticate the first user a second time. Instead, identification of the first stylus and receiving the particular instruction from the first stylus may be sufficient to cause the computing device 100 to launch an application and prepare to receive stylus input from the first stylus.

A second user may have a second stylus that is not paired to the computing device. The second user may provide the particular instruction (e.g., two clicks of a particular button) using the second stylus, causing the computing device to launch an application that is capable of receiving stylus input. The first user may have previously defined (1) which particular instruction causes the application to be launched and (2) which application is launched. The application that the computing device launches in response to the second user's particular instruction may be the same application that the first user caused to be launched or may be a different application than the application that the first user caused to be launched. For example, the first user may be able to launch a first application that accepts cursive input, printed input, and graphical input (e.g., OneNote®) while the second user may be able to launch a second application that can accept cursive input and printed input but not graphical input (e.g., Microsoft® NotePad). The second user can use the application on the computing device to provide notes (e.g., using the second stylus) without being asked to login (e.g., without being authenticated). However, the access level provided to the second user may be at the same or at a lower level than the access level provided to the first user. For example, if the first user has full read-write access, then the second user may have partial read-write access or write-only access. If the first user has partial read-write access, then the second user may have partial read-write access or write-only access. If the first user has partial read-write access, then the second user may have write-only access. Thus, the second user's possession of the second stylus only provides the second user an access level with restricted capabilities. The second user's input may be stored in a remote (e.g., cloud-based) storage in response to a particular event (e.g., particular instruction from the second stylus, timeout, or the like). The first user may be able to view and/or edit the second user's input in cloud storage because the first user's access level may be less restricted (e.g., higher) than the second user's access level.

Figure 3:
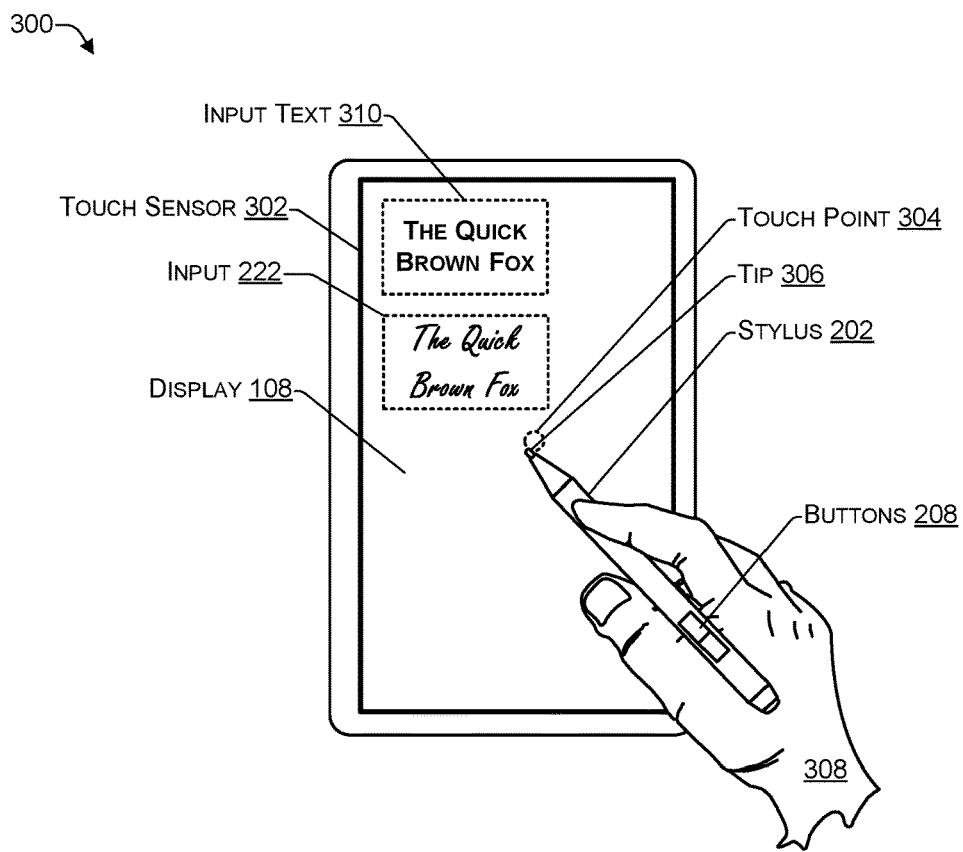
FIG. 3 is a block diagram of a tablet computing device according to some embodiments.

FIG. 3 is a block diagram of a tablet computing device 300 according to some embodiments. In some cases, as illustrated in FIG. 3, the computing device 100 may be implemented as the tablet computing device 300, e.g., using the single display device 108. A touch sensor 302 may be embedded into the display device 108 to detect a touch point 304 of a tip 306 of the stylus 202. The user may manipulate the stylus 202 by holding the stylus 202, such as the user holding the stylus 202 in the user's hand 308.

At least a portion of the input 222 received from the user manipulating the stylus 202 may be converted into input text 310. For example, the input 222 may include cursive or printed letters, numbers, and the like. OCR (or a similar technique) may be used to recognize the characters in the input 222 to create the input text 310. An application may store the input 222, the input text 310, or portions of both in the cloud storage 232 of FIG. 2.

The user may provide particular instruction using one or more of the buttons 208 to launch an application to receive the input 222 from the stylus 202. In some cases, the particular instruction may cause (1) the computing device 100 to power on from a power off state or to resume functioning from a hibernation state and (2) launch one (or more) applications.

Figure 4:
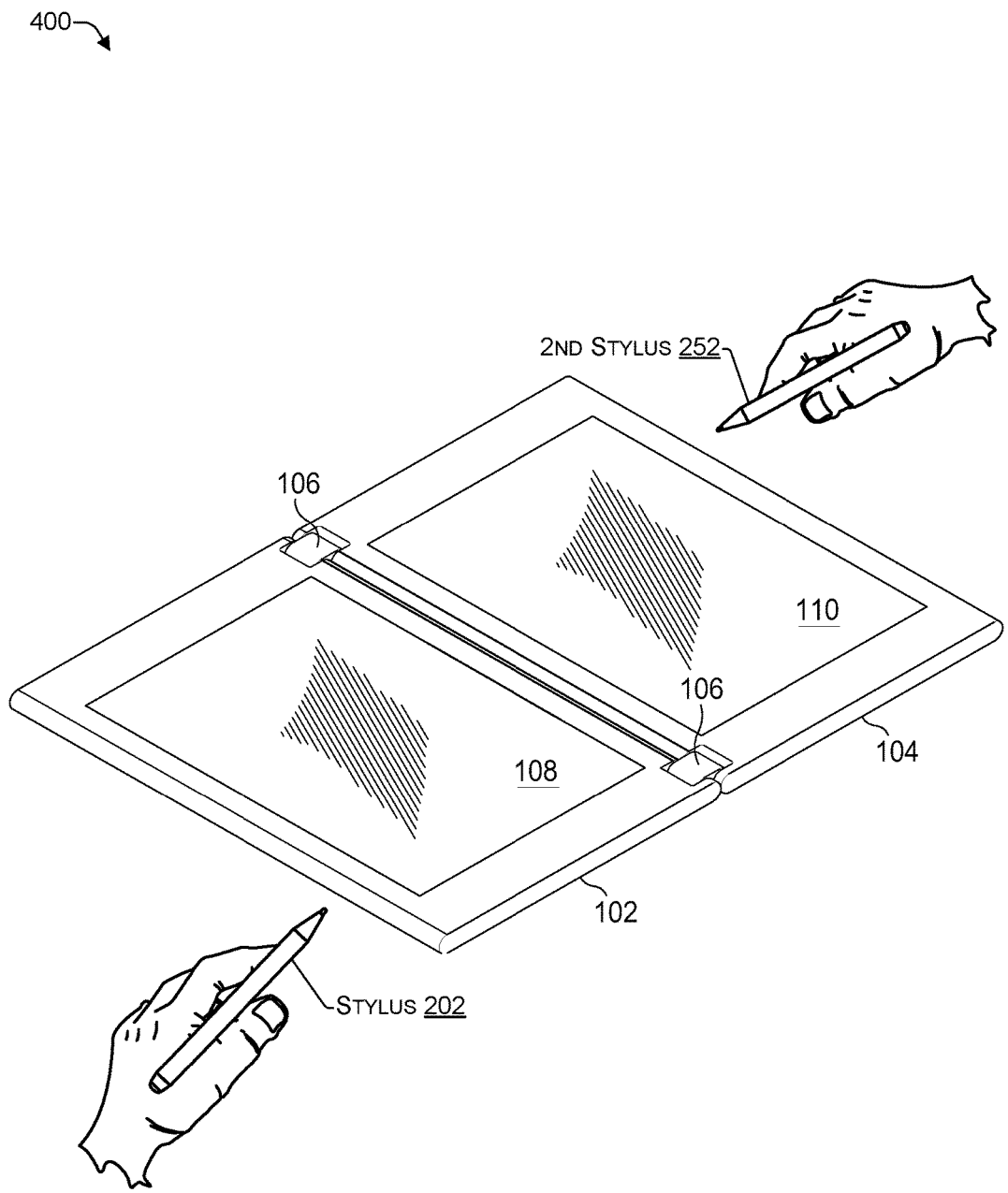
FIG. 4 is a block diagram of a dual-display device according to some embodiments.

FIG. 4 is a block diagram illustrating a dual-display device 400 according to some embodiments. In some cases, the computing device 100 may include the first housing coupled to the second housing 104 using one or more hinges 106. The first housing 102 may include the first display device 108 and the second housing 104 may include the second display device 110. The hinges 106 may enable the housings 102, 104 to be placed at different angles, e.g., between 0 and 360 degrees, relative to each other.

In some cases, a first user and a second user may simultaneously provide input using the stylus 202 and the stylus 252. For example, the first user and second user may collaborate on a particular project and both use the computing device 100 to create notes. To illustrate, the first user may create notes while the second user creates drawings. As another illustration, both users may collaborate on a drawing. As a further illustration, both users may provide notes, with the first user entering a first portion of the notes and the second user entering the second portion of the notes. The first user may use the stylus 202 to provide first input to the computing device 100. Substantially at the same time, the second user may use the second stylus 252 to provide second input to the computing device 100. For example, as illustrated in FIG. 4, the stylus 202 may be used on the first display device 108 to provide the first input and the stylus 252 may be used on the second display device 110 to provide the second input.

Figure 5:
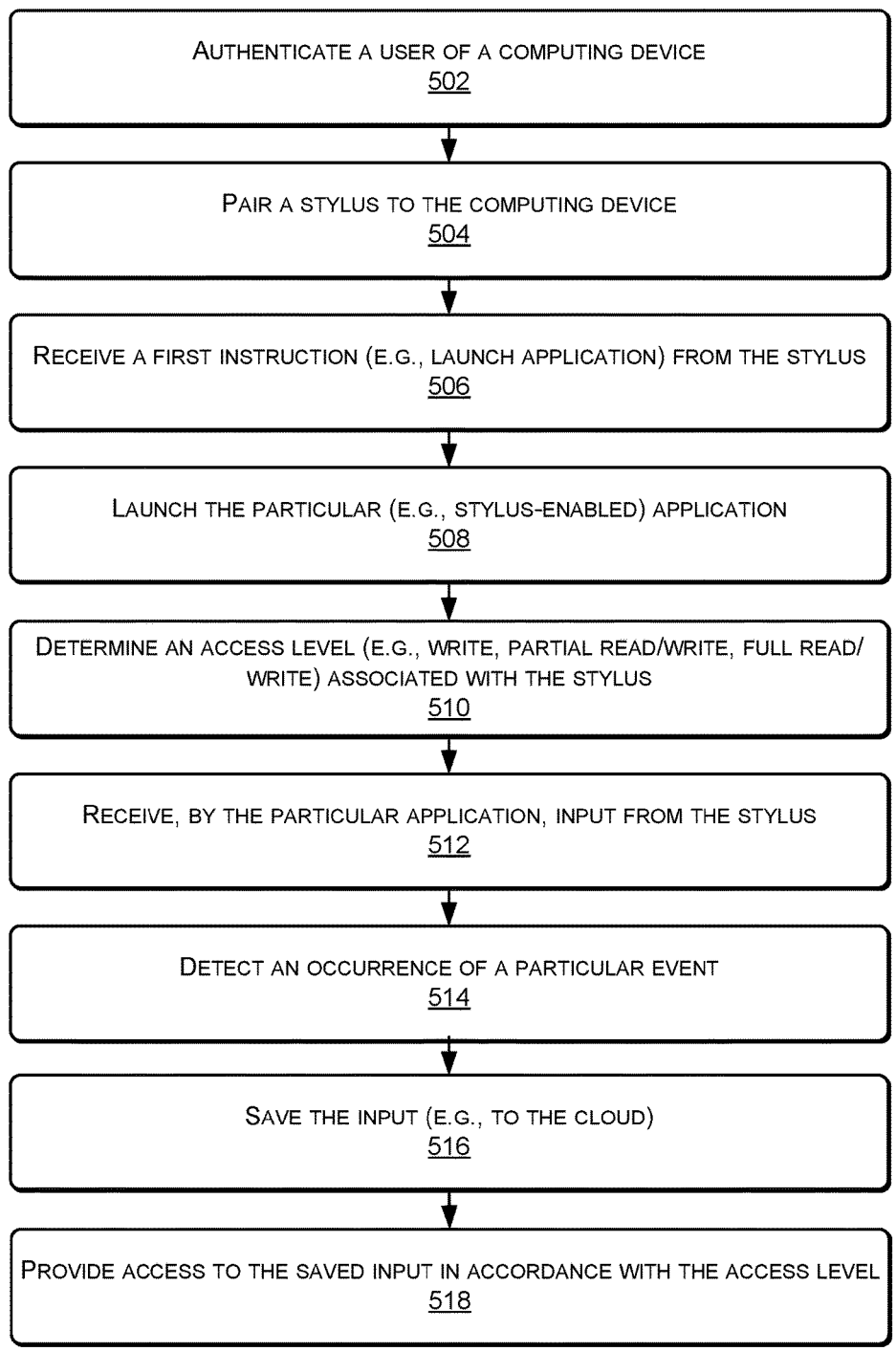
FIG. 5 is a flowchart of a process that includes receiving stylus input from a stylus according to some embodiments.
Figure 6:
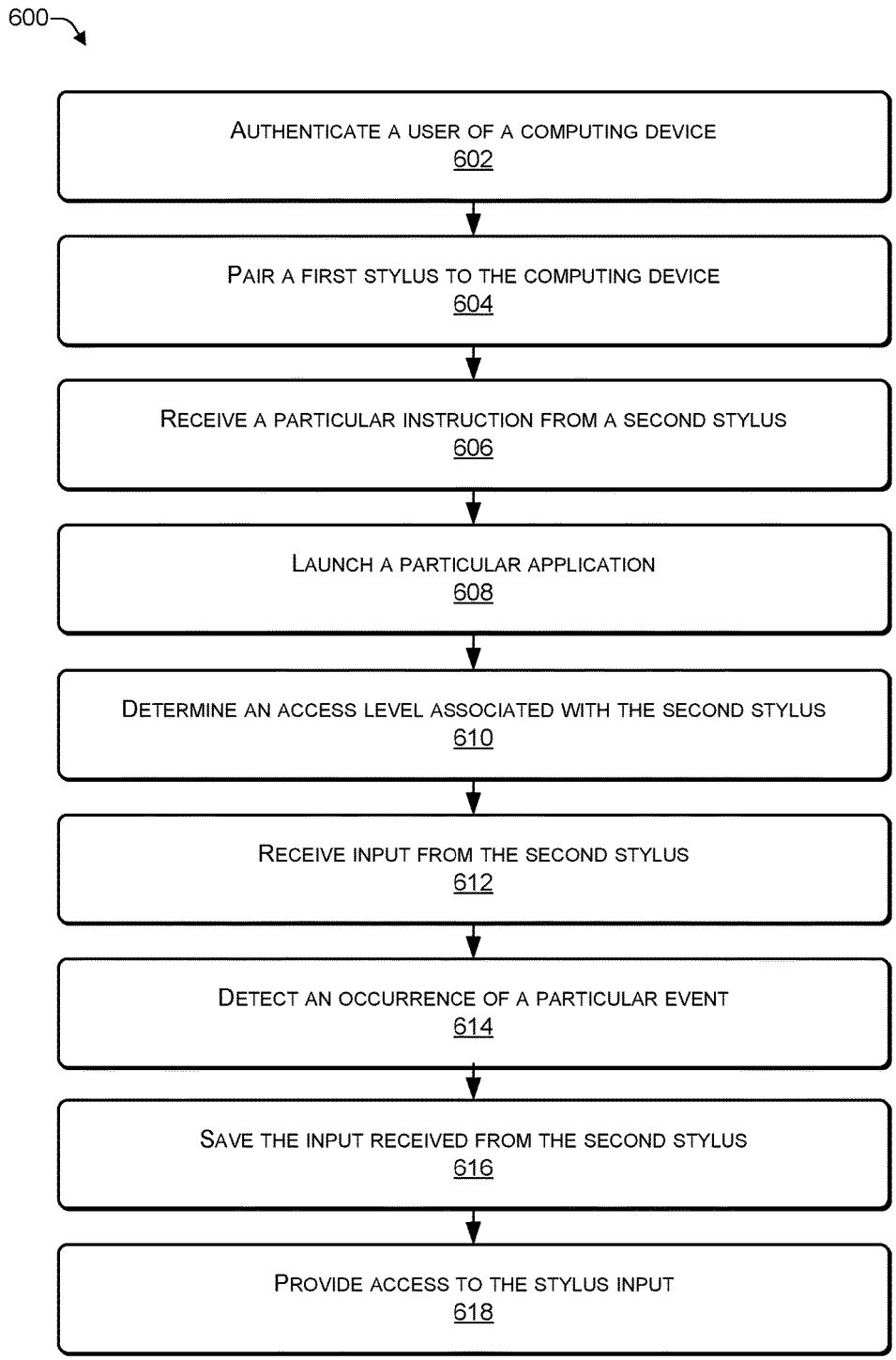
FIG. 6 is a flowchart of a process that includes receiving stylus input from a second stylus according to some embodiments.
Figure 7:
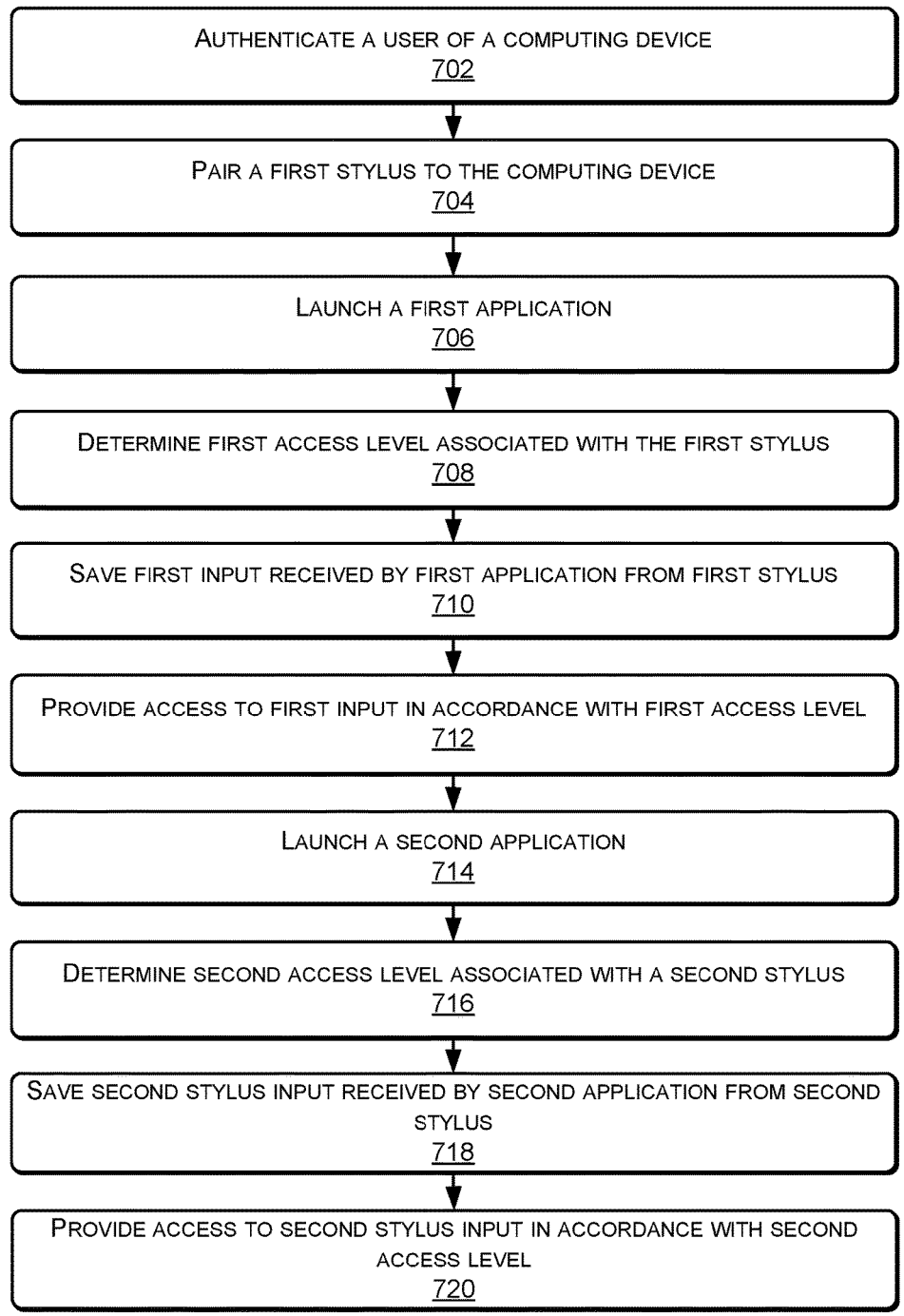
FIG. 7 is a flowchart of a process that includes receiving first stylus input from a first stylus and second stylus input from a second stylus according to some embodiments.

In the flow diagrams of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to FIGS. 1, 2, 3, and 4, as described above, although other models, frameworks, systems and environments may be used to implement this process.

FIG. 5 is a flowchart of a process 500 that includes receiving stylus input from a stylus according to some embodiments. The process 500 may be performed by one or more components of the computing device 100 of FIG. 1, 2, 3, or 4.

At 502, a computing device may authenticate a user. At 504, a stylus (e.g., active stylus) may be paired to the computing device. For example, in FIG. 2, a user may go through the local authentication process 224 to login to the computing device 100. The user may pair the stylus 202 with the computing device 100 using the first wireless technology 258. The details (e.g., which type of device was paired, the device's user identifier, and the like) associated with the pairing may be stored as the pairing data 226. For example, the pairing data 226 may include information indicating that the stylus 202, having a particular device identifier, was paired to the computing device 100. A note taking application may be available to the user even before the user is authenticated, at 502. For example, a user of the computing device 100 may use the stylus 202 to provide and save input (e.g., enter a note) without the user being authenticated. The user may be restricted from viewing or editing the saved input until after the user has been authenticated.

At 506, a first instruction may be received from the stylus. At 508, one or more previously specified applications may be launched (e.g., instantiated). For example, in FIG. 2, the user may provide a particular instruction that causes one (or more) of the applications 222 (e.g., a note taking application) to launch (e.g., instantiate) and begin executing on the computing device 100. The particular instruction that causes one (or more) of the applications 222 to automatically launch may be defined by the user. The particular of the applications 222 that are automatically launched may be specified by the user. The user may define the particular instruction using the stylus 202. For example, the particular instruction may be sent from the stylus by the user using one or more of the tip 204, the buttons 208, the sensors 210 (e.g., making a particular gesture while holding the stylus 202 such that the sensors detect the particular gesture), or any combination thereof. For example, the user may perform X clicks (where X>0) of a particular one of the buttons 208, a particular ordered combination of clicks of the buttons 208, X taps of the tip 204 in a particular location in one of the touchscreen display devices 108, 110 of FIG. 1, or the like. To illustrate, the user may click a particular one of the buttons 208 twice to launch a particular application, such as a note-taking application (e.g., OneNote®, Bamboo Paper®, or the like). In some cases, the particular instruction may power on the computing device 100 (e.g., from a power off state or a hibernate state) in addition to causing the computing device 100 to launch the application.

At 510, an access level associated with the stylus may be determined. At 512, input may be received by the application from the stylus. For example, in FIG. 2, the computing device 100 may determine the access level 228 associated with the stylus 202. The user may provide the input 230 to one of the applications 222 using the stylus 202. For example, the input 230 may include cursive letters and numbers, printed letters and numbers, drawings, doodles, and other types of input that can be provided using a stylus. In some cases, the computing device 100 may use optical character recognition (OCR) or another technique to convert at least a portion of the input into text input. A note taking application may be available to the user even before the user is authenticated. For example, a user of the computing device 100 may use the stylus 202 to provide and save input (e.g., enter a note) without the user being authenticated. The user may be restricted from viewing or editing the saved input until after the user has been authenticated.

At 514, an occurrence of a particular event may be detected. At 516, the input may be stored at a remote location (e.g., in cloud storage). For example, in FIG. 2, in response to detecting the occurrence of a particular event, the computing device 100 may automatically (e.g., without human interaction) save the input 230 to the cloud storage 232. For example, if the Nth user provided the input 230 using the stylus 202, the input 230 may be transmitted using the second wireless technology 256 to the cloud storage 232 for storage in the corresponding user's account. The particular event that causes the computing device 100 to automatically save the input 230 to the cloud storage 232 may be defined by the user. The particular event that causes (e.g., triggers) the computing device 100 to automatically save the input 230 may include a particular instruction provided by the user such as Y clicks (where Y>0 and Y not equal to X) of a particular one of the buttons 208, a particular ordered combination of the buttons 208, Y taps of the tip 204 in a particular location in one of the touchscreen display devices 108, 110 of FIG. 1, or the like. For example, the user may click a particular one of the buttons 208 three times to save the input 230 to the cloud storage 232. The particular event that causes (e.g., triggers) the computing device 100 to automatically save the input 230 may include a timeout. For example, if the computing device 100 does not receive additional input from the stylus 202 for more than Z seconds (e.g., Z>10) then the computing device 100 may automatically save the input 230 to the cloud storage 232. The user may define the size of the timeout that determines when the input 230 is saved to the cloud storage 232. The particular event that causes (e.g., triggers) the computing device 100 to automatically save the input 230 may include the user selecting a "save" selection in a user interface of one of the applications 222.

At 518, the saved input may be accessible according to the access level associated with the stylus. For example, in FIG. 2, the input 230 may be saved along with a time stamp (e.g., indicating when the input 230 was received or saved by the cloud storage 232) and the access level 228 associated with the user of the stylus 202. The cloud storage 234 may provide access to the saved input 230 according to the access level 228. For example, assume the input 230 is stored as the Mth input 242 and the Mth access level 250 identifies the access level 228. If the Mth access level 250 is write-only, then a user of the stylus 202 may be unable to access (e.g., view or edit) the Mth input 242. If the Mth access level 250 is partial read-write, then a user of the stylus 202 may be able to access (e.g., view and edit) the Mth input 242 as well as other inputs created with the stylus 202 but may be unable to access other inputs created by other devices (e.g., the stylus 252) in the Nth user input folder 236. If the Mth access level 250 is full read-write access level, then a user of the stylus 202 may be able to access (e.g., view and edit) the Mth input 242 and may be able to access all of the inputs 240 to 242 in the Nth user input folder 236.

Thus, a first user may provide a particular instruction (e.g., two clicks of a particular button of a stylus, such as the first stylus) using the first stylus to launch an application that is capable of receiving stylus input. The first user may define (1) which particular instruction causes the application to be launched and (2) which application is launched. The stylus input may be stored in a remote (e.g., cloud-based) storage in response to a particular event (e.g., a particular instruction from the stylus, a timeout, or the like). In this way, the first user can begin taking notes using the computing device and the first stylus without being asked to login (e.g., be authenticated). The saved notes may not be viewed until the user has been authenticated by the cloud service. If the user is authenticated and then pairs a stylus to the computing device, the relationship (e.g., pairing) between the first stylus and the computing device establishes a trusted relationship. Thus, the first user's possession of the first stylus may be sufficient to identify the first user to the computing device at a particular access level. Therefore, the computing device may not authenticate the first user if the user has already been authenticated once. Instead, identification of the first stylus and receiving the particular instruction from the first stylus may be sufficient to cause the computing device 100 to launch an application and prepare to receive stylus input from the first stylus.

FIG. 6 is a flowchart of a process 600 that includes receiving stylus input from a second stylus according to some embodiments. The process 600 may be performed by one or more components of the computing device 100 of FIG. 1, 2, 3, or 4.

At 602, a computing device may authenticate a user. At 604, a first stylus may be paired to the computing device. For example, in FIG. 2, a user may undergo the local authentication 224 when logging in to the computing device 100. The user may pair the stylus 202 with the computing device 100 using the first wireless technology 258. The details (e.g., which type of device was paired, user identifier, and the like) associated with the pairing may be stored as the pairing data 226. For example, the pairing data 226 may include information indicating that the stylus 202 has a particular device identifier and indicating that the stylus 202 is currently paired with the computing device 100.

At 606, a particular instruction may be received from a second stylus. At 608, a particular application (or set of applications) may be launched. For example, in FIG. 2, a second user may provide a particular instruction that causes one (or more) of the applications 222 (e.g., a note taking application) to launch (e.g., instantiate) and begin executing on the computing device 100. The particular instruction that causes one (or more) of the applications 222 to automatically launch may be defined by a user of the computing device 100. The particular of the applications 222 that are automatically launched may be specified by the user of the computing device 100. For example, the particular instruction may be provided using the second stylus 252 (e.g., using one or more of the tip, the buttons, the sensors, or the like of the second stylus 252). The second stylus 252 may not be paired with the computing device 100. For example, the second stylus 252 may be paired with a second computing device associated with the second user and may not be paired with the computing device 100. To send the particular instruction from the stylus 252 to the computing device 100, the second user may perform X clicks (where X>0) of a particular one of the buttons of the second stylus 252, a particular ordered combination of clicks of the buttons of the second stylus 252, X taps of the tip of the second stylus 252 (e.g., in a particular location in one of the touchscreen display devices 108, 110 of FIG. 1), or the like. To illustrate, the second user may click a particular one of the buttons of the second stylus 252 twice to launch a particular application, such as a note-taking application (e.g., OneNote®, Bamboo Paper®, or the like). In some cases, the particular instruction may power on the computing device 100 (e.g., from a power off state or a hibernate state) in addition to causing the computing device 100 to launch the application (e.g., an application capable of receiving stylus input).

At 610, an access level associated with the second stylus may be determined. At 612, input may be received from the second stylus (e.g., by the particular application). For example, in FIG. 2, the computing device 100 may determine the access level 228 associated with the second stylus 252. The second user may provide the input 230 to one of the applications 222 using the stylus 252. For example, the input 230 may include cursive letters and numbers, printed letters and numbers, drawings, doodles, and other types of input that can be provided using a stylus. In some cases, the computing device 100 may use optical character recognition (OCR) or another technique to convert at least a portion of the input 230 into text-based input. The application 222 that receives the input 230 may store the input locally, e.g., in the memory 116.

At 614, an occurrence of a particular event may be detected. At 616, the input received from the second stylus may be saved (e.g., in a remote location, such as cloud storage). At 618, access to the saved stylus input may be provided. For example, in response to detecting a particular event, the computing device 100 may automatically (e.g., without human interaction) save the input 230 to the cloud storage 232. The particular instruction that causes the computing device 100 to automatically save the input 230 to the cloud storage 232 may be defined by a default setting of the operating system 220 or by the user of the computing device 100. For example, if the first user provided the input 230 using the stylus 252, the input 230 may be transmitted using the second wireless technology 256 to the cloud storage 232 for storage in the first user's account. The particular event that causes (e.g., triggers) the computing device 100 to automatically save the input 230 may include a particular instruction provided by the user such as Y clicks (where Y>0 and Y not equal to X) of a particular one of the buttons of the second stylus 252, a particular ordered combination of clicks of the buttons of the second stylus 252, Y taps of the tip of the second stylus 252 (e.g., in a particular location in one of the touchscreen display devices 108, 110 of FIG. 1), or the like. For example, the user may click a particular one of the buttons of the second stylus 252 three times to save the input 230 to the cloud storage 232. The particular event that causes (e.g., triggers) the computing device 100 to automatically save the input 230 may include a timeout, e.g., if the computing device 100 does not receive additional input from the stylus second 252 for more than Z seconds (e.g., Z>10) then the computing device 100 may automatically save the input 230 to the cloud storage 232. The user associated with the computing device 100 may define the size of the timeout that determines when the input 230 is saved to the cloud storage 232. The particular event that causes (e.g., triggers) the computing device 100 to automatically save the input 230 may include the second user selecting a "save" selection in a user interface of one of the applications 222.

The input 230 from the second user may be saved along with a time stamp (e.g., indicating when the input 230 was received or saved by the cloud storage 232) and the access level 228 associated with the second user of the second stylus 252. The cloud storage 234 may send an alert indicating that a note for the first user was saved. The first user may specify what type of alert is provided and to what device the alert is sent. For example, after the input received from the second stylus is saved, the cloud storage facility may send an alert to the first user, indicating that a note was created using the computing device. The alert may cause the first stylus to emit a sound or flash a sequence of lights. The alert may be a text message (e.g., "You have a new note available on your cloud service") to a phone of the first user. In some cases, the text message may include the contents of the input that was saved (e.g., "Please send me a copy of the proposal once you have completed the form."). The cloud storage 234 may provide access to the saved input 230 according to the access level 228. For example, assume the input 230 is stored in the first input folder 234 with a first access level and a first time stamp. If the first access level is write-only, then the second user of the second stylus 252 may be unable to access (e.g., view or edit) the first input. If the first access level is partial read-write, then the second user of the second stylus 252 may be able to access (e.g., view and edit) the first input as well as other inputs created with the second stylus 252 but may be unable to access other inputs (e.g., the Mth input 242) created by other devices (e.g., the stylus 202). If the first access level is full read-write access level, then a user of the stylus 252 may be able to access (e.g., view and edit) all of the inputs stored in the first user input folder 234. In some cases, only an owner (e.g., first user) of the computing device 100 may be able to access (view, edit, and the like) input provided by the first user and the second user.

Thus, a first user may login to (e.g., be authenticated by) a computing device and pair a first stylus with the computing device. A second user may have a second stylus that is not paired to the computing device. The second user may provide a particular instruction (e.g., two clicks of a particular button) using the second stylus, causing the computing device to launch an application that is capable of receiving stylus input. The first user may have previously defined (1) which particular instruction causes the application to be launched and (2) which application is launched. The second user can use the application on the computing device to provide notes (e.g., using the second stylus) without being asked to login (e.g., without being authenticated). In some cases, the access level provided to the second user may be at the same or at a lower level than the access level provided to the first user. For example, if the first user has full read-write access, then the second user may have partial read-write access or write-only access. If the first user has partial read-write access, then the second user may have partial read-write access or write-only access. If the first user has partial read-write access, then the second user may have write-only access. Thus, the second user's possession of the second stylus only provides the second user an access level with restricted capabilities. The second user's input may be stored in a remote (e.g., cloud-based) storage in response to a particular event (e.g., particular instruction from the second stylus, timeout, or the like). The first user may be able to view and/or edit the second user's input in cloud storage because the first user's access level may be less restricted (e.g., higher) than the second user's access level. In some cases, the first user may have access to the second user's input (and to the first user's input) while the second user may not have access to the second user's input (and to the first user's input).

FIG. 7 is a flowchart of a process 700 that includes receiving first stylus input from a first stylus and second stylus input from a second stylus according to some embodiments. The process 700 may be performed by one or more components of the computing device 100 of FIG. 1, 2, 3, or 4.

At 702, a computing device may authenticate a user (e.g., to enable the user to use the computing device). At 704, a user may pair a first stylus to the computing device. At 706, a first application may be launched. At 708, a first access level associated with the first stylus may be determined. At 710, first input received by the first application from the first stylus may be saved (e.g., locally, to a remote location, or both). At 712, access to the first input may be provided in accordance with the first access level. For example, in FIG. 2, a first user may login to (e.g., be authenticated by) the computing device 100. The first user may pair the first stylus 202 with the computing device 100. The first user may provide a particular instruction (e.g., two clicks of a particular button) using the first stylus 202 to launch one of the applications 222. The first user may define (1) which particular instruction (e.g., which particular sequence of button clicks, gestures, taps of the tip 204, or the like) causes one of the applications 222 to be launched and (2) which of the particular applications 222 is launched. In response to a particular event (e.g., a particular set of instructions from the stylus, a timeout, or the like), the input 230 received from the stylus 202 may be stored locally (e.g., in the memory 116), in the cloud-based storage 232, or both. The stored input 230 may be accessible in accordance with the access level 228 associated with the first stylus 202. In this way, the first user can begin taking notes (e.g., the input 230) using the computing device 100 and the first stylus 202 without being authenticated (e.g., logging in) again. The relationship (e.g., pairing) between the first stylus 202 and the computing device 100 may establish a trusted relationship. Thus, the first user's possession of the stylus 202 may be sufficient to identify the first user to the computing device 100 at the particular access level 228. Therefore, the computing device 100 may not authenticate the first user a second time. Instead, identification of the first stylus 202 and receiving the particular instruction from the first stylus 202 may be sufficient to cause the computing device 100 to launch one of the applications 222 and prepare to receive the input 230 from the first stylus 202.

At 714, a second application may be launched. At 716, a second access level associated with a second stylus may be determined. At 718, second input received by the second application from the second stylus may be saved (e.g., locally, to a remote location, or both). At 720, access to the second input may be provided in accordance with the second access level. For example, in FIG. 2, a second user may have the second stylus 252 that is not paired to the computing device 100. The second user may provide the particular instruction (e.g., two clicks of a particular button) using the second stylus 252, causing the computing device 100 to launch one of the applications 222. The first user may have previously defined (1) which particular instruction causes one of the applications 222 to be launched and (2) which of the applications 222 is launched. The particular one of the applications 222 that the computing device 100 launches in response to the second user's particular instruction may be the same application that the first user caused to be launched or may be a different application than the application that the first user caused to be launched. For example, the first user may be able to launch a first application that accepts cursive input, printed input, and graphical input (e.g., OneNote®) while the second user may be able to launch a second application that can accept cursive input and printed input but not graphical input (e.g., Microsoft® Notepad). The second user can use the application on the computing device to provide notes (e.g., using the second stylus 252) without being asked to login (e.g., without being authenticated). However, the access level provided to the second user may be at the same or at a lower level than the access level provided to the first user. For example, if the first user has full read-write access, then the second user may have partial read-write access or write-only access. If the first user has partial read-write access, then the second user may have partial read-write access or write-only access. If the first user has partial read-write access, then the second user may have write-only access. Thus, the second user's possession of the second stylus 252 may provide the second user an access level with restricted capabilities. The second user's input 230 may be stored locally (e.g., in the memory 116, in the cloud-based storage 232, or both, in response to a particular event (e.g., particular button sequence from the second stylus 252, a timeout, or the like). The first user may be able to view and/or edit the second user's input 230 in the cloud storage 232 because the first user's access level may be less restricted (e.g., higher) than the second user's access level.

Figure 8:
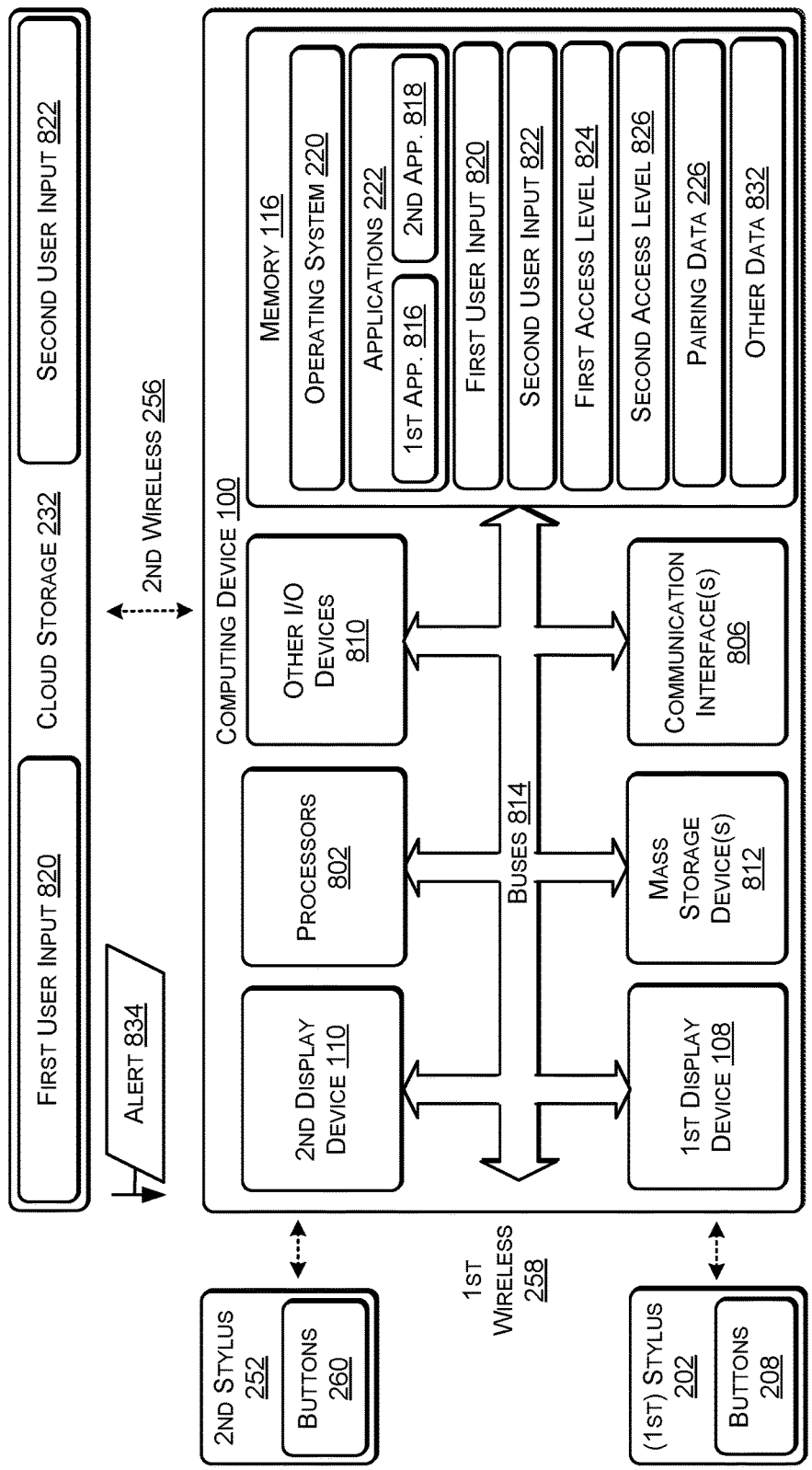
FIG. 8 illustrates an example configuration of a computing device that can be used to implement the systems and techniques described herein.

FIG. 8 illustrates an example configuration of the computing device 100 of FIG. 1 that can be used to implement the systems and techniques described herein. The computing device 100 may include one or more processors 802 (e.g., the CPU 112 and the GPU 114 of FIG. 1), the memory 116, communication interfaces 806 (e.g., including the I/O ports 120), the display devices 108, 110, other input/output (I/O) devices 810 (e.g., keyboard, trackball, and the like, such as the additional components 144), and one or more mass storage devices 812 (e.g., including the memory 116), configured to communicate with each other, such as via one or more system buses 814 (e.g., including the data bus 128, 130) or other suitable connections. While a single system bus is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include the GPU 114 integrated into the CPU 112 or the GPU 114 may be a separate processor device from the CPU 112. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 116, mass storage devices 812, or other computer-readable media.

Memory 116 and mass storage devices 812 are examples of computer storage media (e.g., memory storage devices) for storing instructions that can be executed by the processors 802 to perform the various functions described herein. For example, memory 116 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 812 may be collectively referred to as memory or computer storage media herein, and may be any type of non-transitory media capable of storing computer-readable, processor-executable program instructions as computer program code that can be executed by the processors 802 as a particular machine configured for carrying out the operations and functions described in the implementations herein.

The computing device 100 may also include one or more communication interfaces 806 for exchanging data via a network. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, the cloud storage 232, or the like.

The display devices 108, 110 may be located in the housings 102, 104, respectively, and may be are connected using one or more hinges (e.g., the hinges 106 of FIG. 1). The hinges may enable each display device to be placed at an angle relative to the other display device. For example, the display devices 108, 110 may be used for displaying information and images to users. Other I/O devices 810 may be devices that receive various inputs from a user and provide various outputs to the user, and may include a keyboard, a touchpad, a mouse, a printer, audio input/output devices, and so forth.

The computer storage media, such as memory 116 and mass storage devices 812, may be used to store software and data. For example, the computer storage media may be used to store the operating system 220 of the computing device 100 and software applications 222, including, a first application 816 and a second application 818. A first user may use the first stylus 202 to provide first user input 820 and a second user may use the second stylus 252 to provide second user input 822. A first access level 824 may be associated with the first stylus 202 and a second access level 826 may be associated with the second stylus 252. The memory 116 may also be used to store other data 832.

The first user may (or may not) login to (e.g., be authenticated by) the computing device 100. The first user may pair the first stylus 202 with the computing device 100. The first user may provide a particular instruction (e.g., two clicks of a particular button) using the first stylus 202 to launch one of the applications 222. The first user may define (1) which particular instruction (e.g., which particular sequence of button clicks, gestures, taps of the tip 204, or the like) causes one of the applications 222 to be launched and (2) which of the particular applications 222 is launched (e.g., the first application 816). In response to a particular event (e.g., a particular set of instructions from the stylus, a timeout, or the like), the input 820 received from the stylus 202 may be stored locally (e.g., in the memory 116), in the cloud-based storage 232, or both. The stored input 820 may be accessible in accordance with the first access level 824 associated with the first stylus 202. In this way, the first user can begin taking notes (e.g., the input 820) using the computing device 100 and the first stylus 202 without being authenticated (e.g., logging in). For example, the first user may be able to take notes in a write-only manner, without being authenticated by the computing device. After authentication, the first user may be able to view and edit the notes that the first user created and view and edit notes that other users created. In some cases, the relationship (e.g., pairing) between the first stylus 202 and the computing device 100 may establish a trusted relationship sufficient to identify the first user to the computing device 100 at the particular access level 824. Therefore, after detecting the presence of the stylus 202, the computing device 100 may not re-authenticate the first user. For example, identification of the first stylus 202 and receiving the particular instruction from the first stylus 202 may be sufficient to cause the computing device 100 to launch one of the applications 222 (e.g., the first application 816) and prepare to receive the input 820 from the first stylus 202.

A second user may have the second stylus 252 that is not paired to the computing device 100. The second user may provide the particular instruction (e.g., two clicks of a particular button) using the second stylus 252, causing the computing device 100 to launch one of the applications 222 (e.g., the second application 818). The first user may have previously defined (1) which particular instruction causes one of the applications 222 to be launched and (2) which of the applications 222 is launched. The particular one of the applications 222 that the computing device 100 launches in response to the second user's particular instruction may be the same application (e.g., the first application 816) that the first user caused to be launched or may be a different application (e.g., the second application 818) than the application that the first user caused to be launched. For example, the first user may launch the first application 816 that accepts cursive input, printed input, and graphical input (e.g., OneNote®) while the second user may launch the second application 818 that can accept cursive input and printed input but not graphical input (e.g., Microsoft® Notepad). The second user can use the application on the computing device 100 to provide notes (e.g., using the second stylus 252) without being asked to login (e.g., without being authenticated). However, the access level 826 provided to the second user may be at the same or at a lower level than the access level 824 provided to the first user. For example, if the first user has full read-write access, then the second user may have partial read-write access or write-only access. If the first user has partial read-write access, then the second user may have partial read-write access or write-only access. If the first user has partial read-write access, then the second user may have write-only access. Thus, the second user's possession of the second stylus 252 may provide the second user the second access level 826 with restricted capabilities. The second user's input 822 may be stored locally (e.g., in the memory 116, in the cloud-based storage 232, or both, in response to a particular event (e.g., particular button sequence from the second stylus 252, a timeout, or other event occurring). The first user may be able to view and/or edit the second user's input 822 in the cloud storage 232 because the first user's access level 824 may be less restricted (e.g., higher) than the second user's access level 826.

After the second user provides the second user input 822, the cloud storage 232 may send an alert 834 to the first user indicating that a note (e.g., the second user input 822) was left by someone who is not associated with the computing device 100. For example, the alert 834 may be sent to an address specified by the first user, such as the first stylus 202. The alert 834 may cause the first stylus 202 to produce a user-defined indicator, such as causing a transducer in the first stylus 202 to produce a particular sound or a particular sequence of sounds (e.g., a particular melody, playback of a pulse code modulation (PCM) sound sample, or the like), cause a light emitting diode (LED) or other type of light in the first stylus 202 to light-up or flash, and the like. As another example, the alert 834 may be a text message (e.g., short message service (SMS)) sent to a mobile phone device specified by the first user.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   one or more processors, and
   one or more computer-readable storage media to store instructions that are executable by the one or more processors to perform operations comprising:
   authenticating a first user;
   logging the first user into the computing device based on authenticating the first user;
   pairing a first stylus that is associated with the first user to the computing device wherein the first stylus identifies the first user to the computing device and provides the first user with a first access level;
   initiating execution of a first application based at least in part on receiving a first launch instruction from the first stylus;
   receiving first input based at least in part on contact between the first stylus and a touchscreen display of the computing device;
   saving the first input based at least in part on receiving a save instruction from the first stylus;
   providing the first user with access to the first input in accordance with the first access level;
   initiating execution of a second application based on receiving a second launch instruction from a second stylus that is associated with a second user, the second stylus not paired with the computing device;
   receiving, while the first user is logged in to the computing device, second input from the second user based on contact between the second stylus and the touchscreen display of the computing device;
   determining a second access level associated with the second stylus, wherein the second access level is specified by the first user;
   providing the second user with access to the second input in accordance with the second access level; and
   providing the first user with access to the second input in accordance with the first access level.

2. The computing device of claim 1, wherein the operations further comprise:
   saving the second input based at least in part on receiving a save instruction from the second stylus.

3. The computing device of claim 1, wherein:
   the first stylus comprises one or more buttons;
   the first launch instruction comprises a first ordered sequence of button presses of the one or more buttons of the first stylus; and
   the second launch instruction comprises a second ordered sequence of button presses of the one or more buttons of the first stylus.

4. The computing device of claim 1, wherein the first input comprises at least one of:
   stylus input received from the touchscreen display in response to the first user manipulating the first stylus on the touchscreen display; and
   text input created by performing optical character recognition on the stylus input.

5. The computing device of claim 1, wherein the second access level comprises one of:
   a write-only access level that denies the second user read-access to the first input and provides the second user with write-access to the second input;
   a partial read-write access level that provides the second user with read-access to the first input and provides the second user with read-write access to the second input; or
   a full read-write access level that provides the second user with read-write access to the first input and provides the second user with read-write access to the second input.

6. The computing device of claim 1, wherein saving the first input comprises at least one of:
   saving the first input to a memory of the computing device; or
   saving the first input to a cloud-based storage service.

7. The computing device of claim 1, wherein the operations further comprise:
   determining that the first stylus associated with the first user is providing additional input on the touchscreen display of the computing device; and
   providing the first user with access to the additional input in accordance with the first access level.

8. A method comprising:
  authenticating, by a computing device, a first user;
  logging the first user into the computing device based on authenticating the first user;
  pairing a first stylus that is associated with the first user to the computing device, wherein the first stylus identifies the first user to the computing device and provides the first user with a first access level;
  initiating execution of a first application by the computing device based at least in part on receiving a first launch instruction from the first stylus;
  receiving, by the first application, first input based at least in part on contact between the first stylus and a touchscreen display of the computing device;
  saving the first input based at least in part on receiving a save instruction from the first stylus;
  providing the first user with access to the first input in accordance with the first access level;
  initiating execution of a second application based on receiving a second launch instruction from a second stylus that is associated with a second user, the second stylus not paired with the computing device;
  receiving, while the first user is logged in to the computing device, second input from the second user based on contact between the second stylus and the touchscreen display of the computing device;
  determining a second access level associated with the second stylus, wherein the second access level is specified by the first user;
  providing the second user with access to the second input in accordance with the second access level; and
  providing the first user with access to the second input in accordance with the first access level.

9. The method of claim 8, further comprising:
  saving the second input based at least in part on receiving a save instruction from the second stylus.

10. The method of claim 9, further comprising:
  sending an alert message to a device associated with the first user, wherein the alert message indicates that the second input was provided.

11. The method of claim 9, wherein the second application is different from the first application.

12. The method of claim 8, wherein:
  the first launch instruction comprises a first set of button presses of one or more buttons of the first stylus; and
  the second launch instruction comprises a second set of button presses of the one or more buttons of the first stylus.

13. The method of claim 8, wherein the first input comprises:
  stylus input received from the touchscreen display in response to the first user manipulating the first stylus on the touchscreen display; and
  text input created by performing optical character recognition on the stylus input.

14. One or more non-transitory computer-readable media to store instructions executable by one or more processors to perform operations comprising:
  authenticating, by a computing device, a first user;
  logging the first user into the computing device based on authenticating the first user;
  pairing a first stylus that is associated with the first user to the computing device wherein the first stylus identifies the first user to the computing device and provides the first user with a first access level;
  initiating execution of a first application by the computing device based at least in part on receiving a first launch instruction from the first stylus;
  receiving, by the first application, first input based at least in part on contact between the first stylus and a touchscreen display of the computing device;
  saving the first input based at least in part on receiving a save instruction from the first stylus;
  providing the first user with access to the first input in accordance with the first access level;
  initiating execution of a second application based on receiving a second launch instruction from a second stylus that is associated with a second user, the second stylus not paired with the computing device;
  receiving, while the first user is logged in to the computing device, second input from the second user based on contact between the second stylus and the touchscreen display of the computing device;
  determining a second access level associated with the second stylus, wherein the second access level is specified by the first user;
  providing the second user with access to the second input in accordance with the second access level; and
  providing the first user with access to the second input in accordance with the first access level.

15. The one or more non-transitory computer-readable media of claim 14, further comprising:
  saving the second input based at least in part on receiving a save instruction from the second stylus.

16. The one or more non-transitory computer-readable media of claim 14, wherein the second access level comprises one of:
  a write-only access level that denies the second user read-access to the first input and provides the second user with write-access to the second input;
  a partial read-write access level that provides the second user with read-access to the first input and provides the second user with read-write access to the second input; or
  a full read-write access level that provides the second user with read-write access to the first input and provides the second user with read-write access to the second input.

17. The one or more non-transitory computer-readable media of claim 14, the operations further comprising:
  transitioning the computing device from a low power consumption state to a power on state based at least in part on receiving the first launch instruction from the first stylus.

18. The one or more non-transitory computer-readable media of claim 14, wherein saving the first input comprises at least one of:
  saving the first input to a memory of the computing device; or
  saving the first input to a cloud-based storage service.

19. The one or more non-transitory computer-readable media of claim 14, wherein saving the first input comprises:
  associating a time stamp with the first input;
  associating the first access level with the first input; and
  saving the first input in a folder associated with the first user.

20. The one or more non-transitory computer-readable media of claim 14, further comprising:
  determining that the first stylus associated with the first user is providing additional input on the touchscreen display of the computing device; and
  providing the first user with access to the additional input in accordance with the first access level.

\* \* \* \* \*